US012644556B2

(12) United States Patent
Florencio Dos Santos et al.

(10) Patent No.: US 12,644,556 B2
(45) Date of Patent: Jun. 2, 2026

(54) TOOL AND METHOD FOR INSPECTION OF PIPES USING TWO WAVE MODES GENERATED BY AN EMAT

(71) Applicants: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

(72) Inventors: Rafael Wagner Florencio Dos Santos, Rio de Janeiro (BR); Lúcio De Abreu Corrêa, Porto Alegre (BR); Julio Endress Ramos, Rio de Janeiro (BR); Henrique Tormen Haan De Oliveira, Porto Alegre (BR); Gustavo Zeni, Porto Alegre (BR); Thomas Gabriel Rosauro Clarke, Porto Alegre (BR); Alberto Bisognin, Porto Alegre (BR)

(73) Assignees: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

( * ) Notice: Subject to any disclaimer, the term of this patent is extended or adjusted under 35 U.S.C. 154(b) by 282 days.

(21) Appl. No.: 18/465,056

(22) Filed: Sep. 11, 2023

(65) Prior Publication Data

US 2024/0084948 A1 Mar. 14, 2024

(30) Foreign Application Priority Data

Sep. 13, 2022 (BR) .......................... 1020220183228

(51) Int. Cl.
F16L 55/40 (2006.01)
F16L 101/30 (2006.01)
G01B 17/02 (2006.01)

(52) U.S. Cl.
CPC ........... F16L 55/40 (2013.01); *F16L 2101/30* (2013.01)

(58) Field of Classification Search
CPC ....... F16L 55/40; F16L 2101/30; G01B 17/02
See application file for complete search history.

(56) References Cited

U.S. PATENT DOCUMENTS

| | | | |
|---|---|---|---|
| 5,907,100 A | 5/1999 | Cook | |
| 7,024,935 B2 | 4/2006 | Paige et al. | |
| 7,697,375 B2 | 4/2010 | Reiderman et al. | |
| 7,819,010 B2 | 10/2010 | Alers et al. | |
| 7,923,994 B2 | 4/2011 | Hoyt | |
| 8,201,454 B2 | 6/2012 | Paige | |
| 9,201,045 B2 | 12/2015 | Jamoussi et al. | |

(Continued)

FOREIGN PATENT DOCUMENTS

CN 109375063 A * 2/2019 ........... G01R 31/083

*Primary Examiner* — Laura Martin
*Assistant Examiner* — Anthony W Megna Fuentes
(74) *Attorney, Agent, or Firm* — Knobbe, Martens, Olson & Bear, LLP

(57) ABSTRACT

The present invention pertains to the technical field of pipe inspection, wherein instrumented pipe inspection tools ("pipeline inspection tools"—pigs) are used to verify the structural integrity of said pipes and describes a pipe inspection tool comprising a tool body and at least two articulated arms, wherein each articulated arm connects the tool body to a sensor and keeps said sensor in direct contact with the inner surface of a pipe.

11 Claims, 15 Drawing Sheets

(56) References Cited

U.S. PATENT DOCUMENTS

| | | | |
|---|---|---|---|
| 2003/0136195 A1* | 7/2003 | Krieg ................... | G01N 29/341 |
| | | | 73/628 |
| 2005/0072237 A1 | 4/2005 | Paige et al. | |
| 2011/0041612 A1* | 2/2011 | Paige ................. | G01N 29/2412 |
| | | | 73/623 |
| 2012/0103097 A1* | 5/2012 | Lopez Jauregui . | G01N 29/2412 |
| | | | 73/643 |
| 2017/0153108 A1* | 6/2017 | Kitazawa ............. | G01N 29/348 |

* cited by examiner

Dispersion for a steel plate | Thickness: 9.52 mm

Horizontal shear modes
Steel plate – 9.54 mm of thickness

Displacement SH1 @ 165 kHz

Time [μs]

TOOL AND METHOD FOR INSPECTION OF PIPES USING TWO WAVE MODES GENERATED BY AN EMAT

FIELD OF THE INVENTION

The present invention pertains to the technical field of pipe inspection, wherein instrumented pipe inspection tools ("pipeline inspection tools"—pigs) are used to verify the structural integrity of said pipes. More specifically, the present invention refers to instrumented pigs that use electromagnetic acoustic transducers ("Electromagnetic Acoustic Transducer", EMAT) mounted thereon.

BACKGROUND OF THE INVENTION

In the oil and gas industry, the inspection of pipelines or pipes is considered an extremely important activity, since structural failures caused by cracks, corrosion, diameter variations of the line, etc., result in loss of operational efficiency, risk of accidents with people, environmental risks, among others.

Currently, it is usual to carry out the inspection of pipelines through the use of conventional instrumented tools, also known as "pigs". Inspection techniques that use such tools are considered the best cost/benefit when there is a wish of obtaining an integrity analysis along the entire length of the pipeline.

The instrumented pigs are tools capable of moving inside the pipes carrying measuring instruments to carry out the appropriate structural analysis. These instruments can be part of well-known component inspection techniques, such as conventional ultrasound, dimensional gauges, magnetic sensors, etc.

Among the tools that propose to evaluate the remaining wall of the pipe along the entire length of the line, those that obtain the best quantitative results are those that use the conventional ultrasound technique to carry out the measurements. In these cases, to achieve an adequate coverage over the entire internal area of the line, a large number of sensors installed in the tool is necessary and, consequently, its size, complexity and cost are high. In addition, as the measurements are made punctually, they represent a sampling of the thicknesses found along the line.

In addition, there are several subsea rigid pipelines, wherein it is not possible to carry out an inspection with a conventional instrumented pig, either due to the configuration of the pipeline (large diameter variations along the route, geometric restrictions by valves, or denting, etc.), or due to the inexistence of an instrumented pig launcher/receiver installed in the pipeline, although there is one for cleaning pigs (instrumented pig launchers and receivers are larger than those needed for launching cleaning pigs).

Further, due to the lack of available technological alternatives of better cost/benefit, conventional instrumented pigs are often used in periodic inspections of subsea rigid pipelines, even when a data history indicates that the internal corrosion stage is not an advanced stage, thus making the process onerous.

Additionally, there are onshore pipelines subject to actions by third parties for theft of products (clandestine derivations), so that a periodic conventional instrumented pig passage, monthly or bimonthly, for example, makes inspection costs high due to the need for replacement of the equipment.

Therefore, in view of the aforementioned technical problems and the currently available solutions, there is a need of developing a pipe inspection tool, with low-cost technology, capable of inspecting onshore or subsea rigid pipes and identifying through holes or loss of internal and external thickness by using a simple arrangement containing few sensors/transducers.

STATE OF THE ART

The search for the history of the invention in question led to some documents that disclose matters within the technological field of the present invention.

Document U.S. Pat. No. 7,697,375 B2 describes a combined electromagnetic acoustic transducer (EMAT), adapted to generate acoustic waves of the shear wave (SH) type and acoustic waves of the LAMB type in a conductive coating, whose surroundings must be analyzed. The transducer of the document comprises a magnetic assembly and two RF coils implemented as a multilayer printed circuit board. Each coil is used to generate or receive acoustic signals of one type of wave. Compared to using two single-wave type transducers, the combined EMAT significantly reduces the overall force of attraction to the housing and correspondingly simplifies the mechanics of the measurement tool. However, the inspection tool proposed by the document uses complex arrangements with a plurality of sensors, not defining a technique capable of encompass the measurements covering the entire volume of pipe material in a "cut" of the pipe.

Additionally, document US 2005/0072237 A1 discloses a pipe inspection pig for locating and/or sizing defects similar to cracks in pipe walls, the pig comprising at least one transmission transducer for transmitting energy circumferentially around the pipe wall and at least one associated receiving transducer located adjacent the transmitting transducer, the arrangement being such that, for a given defect in the pipe wall, the ultrasound energy traveling circumferentially within the pipe wall impinges on the defect. Part of said energy is reflected by the defect circumferentially back to the receiving transducer in the form of a first data stream, and the remainder of said energy passing through the defect to be attenuated thereby and thence traveling circumferentially from the wall to the receiving transducer in the form of a second data stream, the interpretation of the first and second data streams allowing the location and/or sizing of the defect to be determined. However, the sensors proposed by said document do not emit, simultaneously, each one, two different wave modes. The document also does not suggest a sensor assembly structure capable of promoting adequate support for the internal parts and electrically shielding the sensor elements from external noise.

In turn, document U.S. Pat. No. 5,907,100 describes a detection and imaging system 10 to locate defects in pipes using electromagnetic acoustic transducer (EMAT) sensors. The system includes an ultrasonic generator 22 configured to transmit a pulse signal to the EMAT transmitter 16 that, in turn, sends an ultrasonic wave through a pipe 13. The EMAT receiver 18 is configured to detect the transmitted ultrasonic signal 24 and receive a reflected ultrasonic signal that is reflected by a defect in the pipe. A processor is configured to generate a filter signal based on the transmitted ultrasonic signal 24, to correlate the filter signal and the rejected ultrasonic signal, to derive the location of the defect relative to the receiver, and to display the defect profile. However, the system proposed in this document does not disclose a correct distance between the magnets and transducers, the stacking between the coils and magnets and the simultaneous transmission of two different wave modes by the emitter sensor.

Document U.S. Pat. No. 7,819,010 B2 provides a device for inspecting walls of ferromagnetic components for defects. The device comprises a sending transducer that excites ultrasound waves into a wall area of a magnetized ferromagnetic component wall in a predetermined direction of magnetization. Ultrasound waves propagate in a path guided by the sending transducer. A receiving transducer receives the ultrasound waves at a spacing from the sending transducer. The configuration of the sending transducer and a high frequency emitted by the sending transducer, whose high frequency must be determined based on the wall thickness of the ferromagnetic component, are selected in order to carry out the excitation of horizontal shear waves ("shear waves"—SH) of higher order. The path orientation is selected at an angle inclined to the predetermined magnetization direction. The receiving transducer is positioned to the side of the path and is oriented toward a predetermined test area of the wall section in the path. However, said document does not suggest or disclose a simplified sensor assembly structure, in which the signal measured by the receiving EMAT sensor contains a mixture of two modes (SH0 and SH1), which may be superimposed. The set of magnets in this document is not fixed or supported by a polymeric structure that ensures the positioning of each sensor.

U.S. Pat. No. 7,024,935 B2 describes an electromagnetic acoustic transducer for ultrasound excitation in a ferromagnetic material under test, which includes a magnetic unit arranged to be moved relative to the material under test, to magnetize a surface layer of the material, and an electrical winding powered by an alternating current source, the magnetic unit and the electrical winding, in use, being applied in sequence to the material under test, whereby electrical winding is positioned adjacent to the material subsequent to its magnetization by the magnetic unit, the alternating magnetic flux created by winding interacting with the remaining magnetization of the material to create ultrasonic vibration of the material. However, in the EMAT sensor proposed by the document, the operation is performed with the magnets physically separated from the coil/winding, and the wave generation mechanism occurs through the remaining magnetization of the material.

Further, document U.S. Pat. No. 8,201,454 B2 describes an ultrasonic pipe inspection apparatus that uses two different wave modes (for example, a horizontally polarized shear mode and a symmetrical Lamb wave mode) to discriminate different types of defects by comparing the corresponding signals collected from the defects. The EMATs sensors can detect the signals. The detected amplitudes of the collected signals from both wave modes are compared to calculate a ratio, which can be compared with a distribution of ratio values for known defects to evaluate the type of detected defect. The apparatus may be a sensor module mountable on a pipe vehicle and having a plurality of sensors distributed around its periphery. However, the method described in this document uses two modes of guided waves that present orthogonal displacements to each other. The use of this pair of modes has the purpose of detecting cracks. Different sensors are used to generate each mode; in addition, the sensor that emits the wave can also receive its generated echo. The document does not disclose or suggest the use of an inspection tool in which a single sensor is used to generate two distinct modes and another sensor (with equal constructive features) is used as a reader.

Additionally, document U.S. Pat. No. 9,201,045 B2 discloses systems, devices and methods for inspecting a pipe body. An electromagnetic acoustic transducer (EMAT) tubular inspection system for inspecting a pipe body includes an EMAT in-line tubular inspection device. The device may include a column with a longitudinal support body and radially projecting rails and several telescoping sections, each connected to the radially projecting rails. This document describes a plurality of EMAT sensors responsible for emitting, each one of them, different modes. The modes described in that document would be SHEAR Horizontal and Vertical modes and shallow mode. However, the document does not disclose a simplified arrangement, using few sensors, in which a sensor is capable of emitting two modes simultaneously.

Finally, document U.S. Pat. No. 7,923,994 B2 discloses a system and method for inspecting the wall of a pipe while running through the same. The system may comprise a pipe portion comprising a pipe wall forming a cylindrical pipe defining a circumferential direction and an axial direction. The system may further include an in-line inspection tool positioned within the pipe portion. The in-line inspection tool may include a structure extending in the axial direction and at least one magnet connected to the structure and positioned to generate a magnetic field. The magnetic field can be oriented obliquely to the circumferential and axial directions of the pipe. The inspection tool may include a transmitter connected to the frame to generate an inspection signal within the magnetic field. However, said document uses an EMAT sensor formed by a pair of magnets positioned distanced from each other responsible for applying a magnetic field in the material with an oblique orientation to the main direction of the pipe. The sensor coil employed by the document is positioned between two magnets. Thus, the patent document fails to disclose a set formed by magnets and a coil stacked and oriented parallel to the main axis of the pipe.

BRIEF DESCRIPTION OF THE INVENTION

In general, the present invention proposes a pipe inspection tool that is applicable to rigid, onshore and subsea pipelines, being able to detect through holes, cracks and internal and external thickness losses, by using a simple arrangement of EMAT (Electromagnetic acoustic transducer) sensors/transducers, minimally consisting of an emitter sensor and a receiver sensor, wherein the emitter sensor simultaneously emits two wave modes of interest that will be separated, after receipt at the receiver sensor, by frequency bands, allowing the specific analysis of each mode independently.

The pipe inspection tool proposed by the present invention has as one of its objectives to evaluate the pipe using the guided wave technique, which is a variation of the conventional ultrasound. Such a technique has the ability to encompass the measurements of the pipe more comprehensively, throughout the entire volume of material in a "cut" of the pipe. The coverage of the pipe area encompassed by the technique occurs by making repeated measurements while the inspection tool moves through the pipe, inspecting approximately the entire volume of material that makes up the line.

In addition, as mentioned earlier, the present invention has as an additional differential the reduced number of sensors needed in the tool for the inspection task, wherein a pair of sensors (emitter and receiver) is minimally used, which reduces the complexity and, consequently, the total size of the tool and its associated cost.

It is further an objective of the present invention to present a tool with a sensor capable of emitting and receiving two modes of guided waves simultaneously, SH0 and SH1, which belong to the same family of shear modes ("shear wave mode") and represent a solution for detecting defects, such as corrosion, on the pipe walls (inner or outer walls). For that purpose, the present invention uses a method to evaluate the structure, which takes into account only the acoustic waves that are emitted from the emitter sensor, pass through the corrosion region, and are captured by the receiver sensor, that is, only the signals that pass through the detected defect. The physical phenomenon related to this strategy is the change in the cut-off frequency of the SH1 mode and the insensitivity of the SH0 mode to the corrosion. Thus, an evaluation of the SH1 by SH0 ratio is a determining factor for corrosion detection.

In addition, it is also one of the objectives of the present invention to provide a tool in which one of the innovative differentials is related to the decision strategy as to the distance between the sensor magnets. This sizing is responsible for setting a wavelength to be emitted and received from the material to the detriment of other wavelengths that may coexist in propagating modes.

In this way, the present invention achieves its objectives by providing a pipe inspection tool comprising a tool body and at least two articulated arms, wherein each articulated arm connects the tool body to a sensor and maintains said sensor in direct contact with the inner surface of a pipe.

The present invention also describes a pipe inspection method comprising generating, by an emitter sensor, a specific vibration mode on a surface to be inspected, based on a specific wavelength determined from the distance between the magnets of a set of magnets, receiving, by a receiver sensor, a locally modified wave when passing through a region containing damage, containing a mixture of SH0 and SH1 modes, separating the SH0 and SH1 modes through the application of a pair of filters of frequency for frequency band separation, in response to the separation of SH0 and SH1 modes, obtaining two signals, in which each signal represents a respective mode, dividing the values of the SH1 signal by the maximum value found for the SH0 signal, comparing the amplitude of the obtained SH1 with a reference amplitude of the intact pipe, estimating a cut-off frequency of the SH1 mode based on the lowest frequency present in the obtained signal, and estimating a remaining thickness through the estimated cut-off frequency.

As advantages of the tool and method of the present invention, it should be noted that they can be used for the inspection of piggable lines by conventional instrumented pig as a cheaper and routine tool, in order to increase the interval required for use more expensive tools. Further, the present invention can be applied for the inspection of non-piggable lines by conventional instrumented pig, in places where there is a launcher and receiver of a cleaning pig, but not of an instrumented pig. Additionally, the present invention may enable the inspection of pipelines with greater periodicity and lower cost compared to the use of a conventional instrumented pig with regard to the detection of clandestine derivations used for theft of product in the pipelines.

BRIEF DESCRIPTION OF FIGURES

The foregoing brief description, as well as the detailed description below of the preferred embodiments of the invention in question will be better understood when read together with the accompanying drawings. For the purpose of illustrating the present invention, embodiments thereof are shown in the drawings. It should be understood, however, that the invention in question is not just limited to the precise arrangements and instruments as shown.

Thus, the present invention will be described below with reference to its typical embodiments and with reference to the appended drawings, in which.

DETAILED DESCRIPTION OF THE INVENTION

Figure 1A:
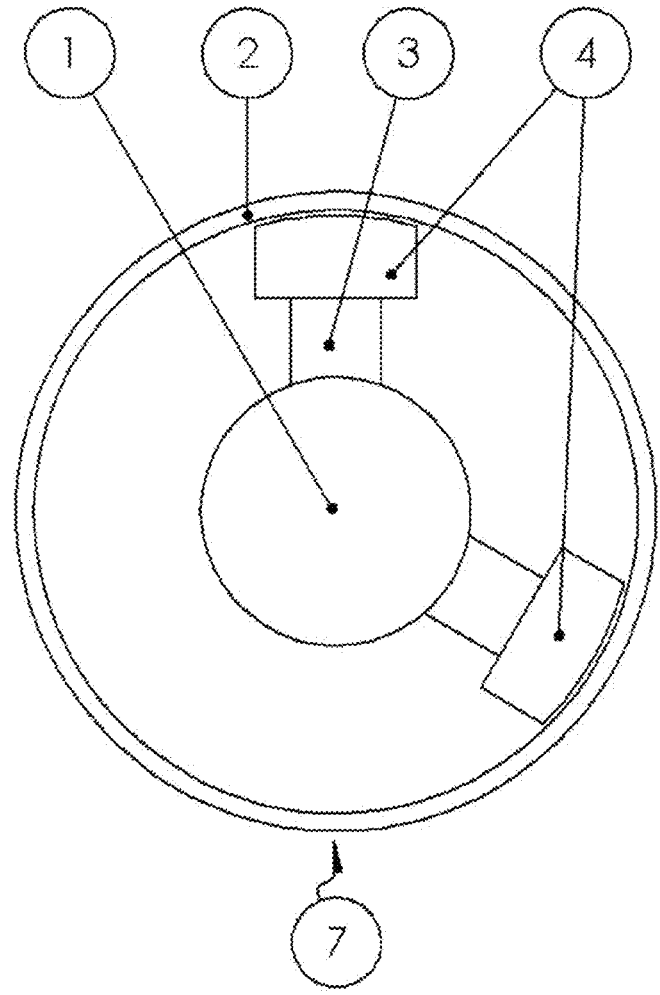
FIG. 1A shows a top view of a pipe inspection tool with an arrangement for a pair of sensors, according to an exemplary configuration of the present invention.

Next, details of the preferred embodiments of the present invention illustrated in the accompanying drawings are shown. Wherever possible, the same or similar reference numerals will be used throughout the drawings to describe the same or similar features. It should be noted that the drawings are in simplified form and are not represented to exact scale, so minor variations are anticipated.

Figure 1B:
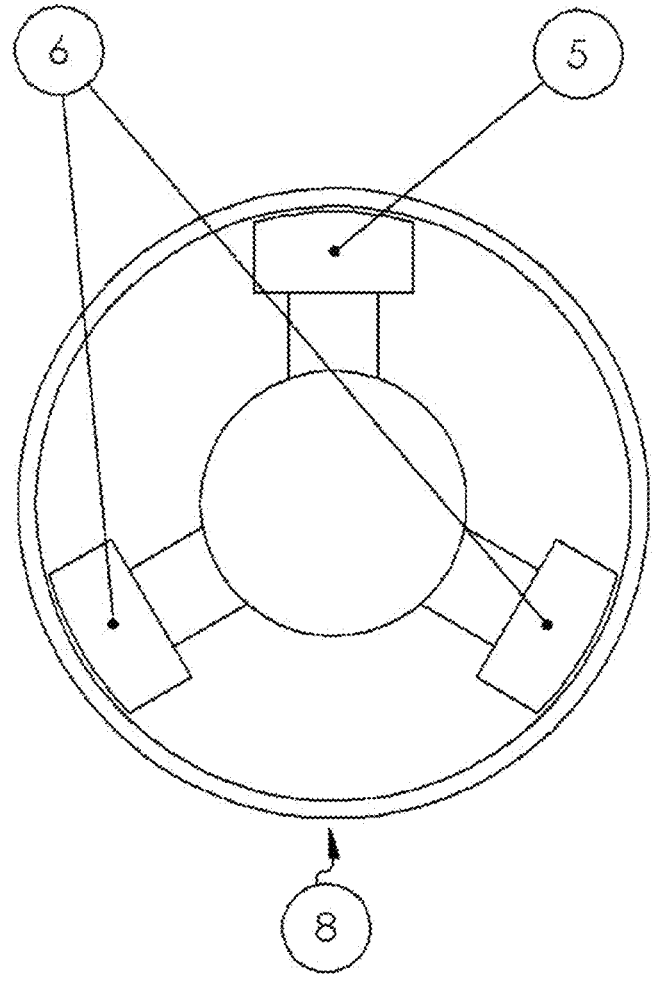
FIG. 1B shows a top view of a pipe inspection tool with an arrangement for a trio of sensors, according to an exemplary configuration of the present invention.

FIGS. 1A and 1B present a pipe inspection tool to evaluate the integrity of subsea or onshore pipes through the use of EMAT ("Electromagnetic Acoustic Transducer") sensors. Particularly, the pipe inspection tool comprises a tool body (1) and at least two articulated arms (3), wherein each articulated arm (3) connects the tool body (1) to a sensor (4).

The tool body (1) is positioned substantially centrally inside a pipe (2) and configured to move inside the same. In addition, the body (1) supports the at least two articulated arms (3) responsible for keeping their respective associated sensors (4) in direct contact with the inner surface of the pipe (2).

According to a preferred and exemplary embodiment of the present invention, as shown in FIG. 1A, the assembly containing the tool body (1) and the articulated arms (3) operates in an arrangement (7) with at least one pair of sensors (4), each of the sensors (4) is connected to the tool body (1) by means of an articulated arm (3), with the articulated arms (3) configured so that, independently, they allow the approximation and distancing of the sensor from the pipe wall (1).

According to a preferred and exemplary embodiment of the present invention, as shown in FIG. 1A, one of the sensors (4) of the paired arrangement (7) is configured to act as an emitter sensor, and the second sensor of the at least two sensors (4) is configured to act as a receiver sensor. The sensors (4) of the pair arrangement (7) are separated by a distance of at least one third of the inner perimeter of the pipe (2), equivalent to a minimum angle of 120°.

Further, according to another preferred and exemplary embodiment of the present invention, as shown in FIG. 1B, the inspection tool can comprise at least three sensors in a trio arrangement (8). In this configuration, one of the sensors is configured to act as an emitter sensor (5), while the other two sensors of the at least three sensors are configured to act as receiver sensors (6). Furthermore, one of the two receiver sensors (6) is positioned equidistant from the other sensors in the trio arrangement (8).

Figure 2:
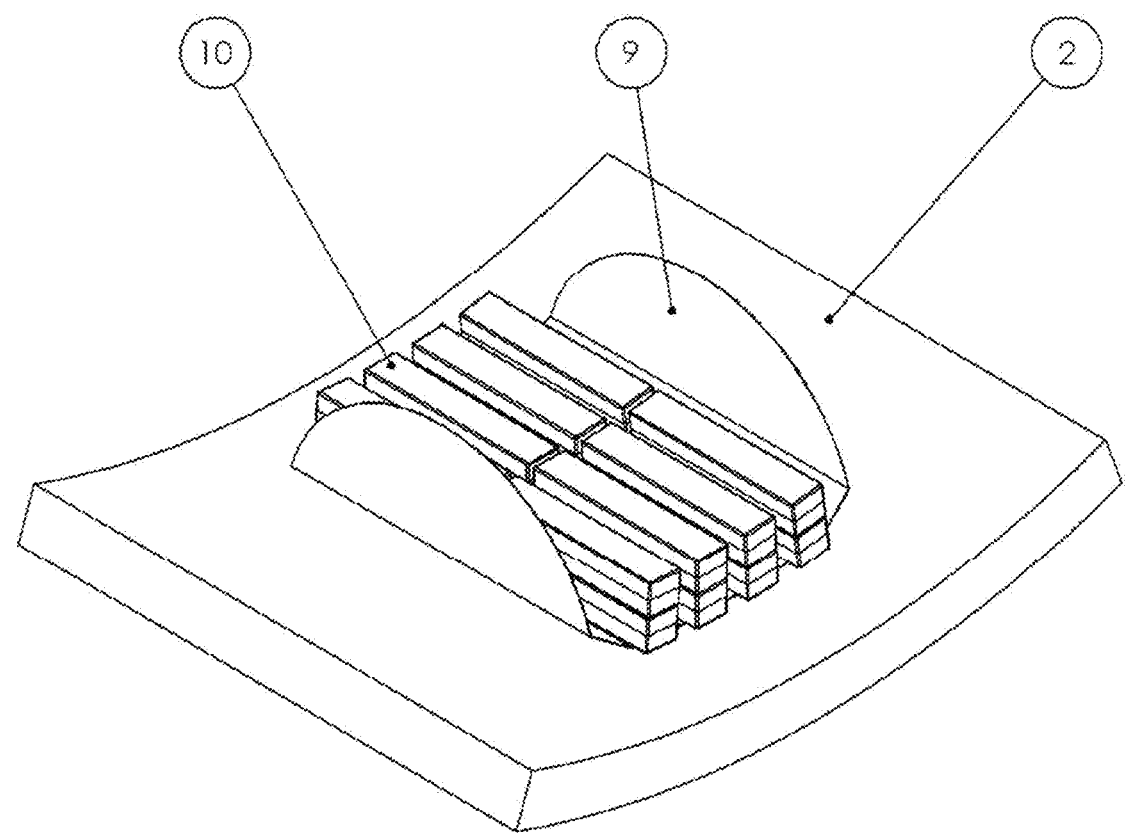
FIG. 2 presents a perspective view of an arrangement containing the main elements of an EMAT sensor, according to an exemplary configuration of the present invention.

The operating principle of the sensors (4, 5, 6) can be better understood based on FIG. 2, which presents an arrangement containing the main elements of an EMAT ("Electromagnetic Acoustic Transducer") type sensor, of according to a preferred and exemplary embodiment of the present invention. Such an arrangement shows a set of magnets (10) arranged on an electrical coil (9), both belonging to the sensors (4, 5, 6) of the tool. The electric coil (9) is placed between the set of magnets (10) and the pipe (2).

Thus, the operation of the sensors (4, 5, 6) occurs by the Lorentz's Force mechanism, which happens when a magnetic field interacts with an induced current present within a material. The force generated by this interaction is orthogonal to both the magnetic field and the induced current. Due to its geometry, the electric coil (9) is configured to control the direction of the induced current, while the arrangement of the set of magnets (10) on the coil (9) acts to control the direction of the generated magnetic field. Consequently, the control of the directions of the induced current and the magnetic field carried out by the arrangement comprising the electric coil (9) and the set of magnets (10) determines the direction of application of force on the material to be inspected; in this case, the pipe (2). The force applied to the material to be inspected generates vibrations that, when performed in a specific way, result in the generation of a proper mode of vibration that propagates in the material.

Figure 3:
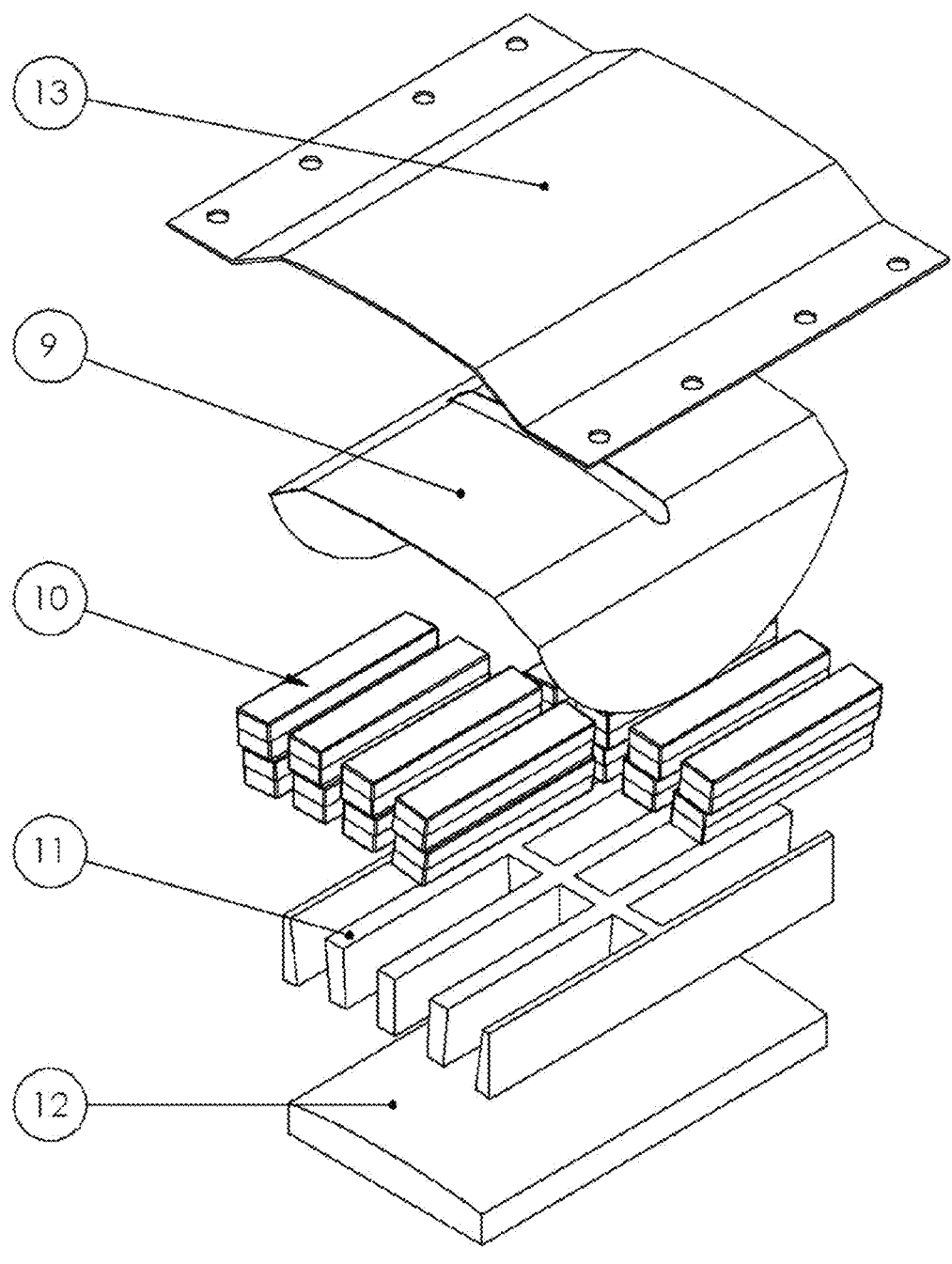
FIG. 3 presents an exploded view of the internal parts of the sensor of the pipe inspection tool, according to an exemplary configuration of the present invention.

FIG. 3 represents an exploded view of the internal components of a sensor (4, 5, 6) of the inspection tool, according to a preferred and exemplary embodiment of the present invention. In this configuration, the set of magnets (10) consists of two rows of magnets mounted side by side and with inverted polarizations with respect to the adjacent magnet.

In addition, the magnets of the set (10) are fixed in a polymeric structure (11) that serves to adjust the positioning of the magnets of the set (10). Further, the magnets of the set (10) are magnetically coupled to a block of ferromagnetic material (12) with the function of concentrating the magnetic field flux.

As presented in FIG. 3, the coil (9) of the arrangement that generates the alternating field is positioned between the magnets of the set (10) and the pipe material (2) to be inspected. The coil (9) is made of a flexible material and acts to cover the set of magnets (10). A sheet of non-ferromagnetic metallic material (13) is arranged over the coil (9) to protect the structure of the sensor (4, 5, 6).

Figure 4:
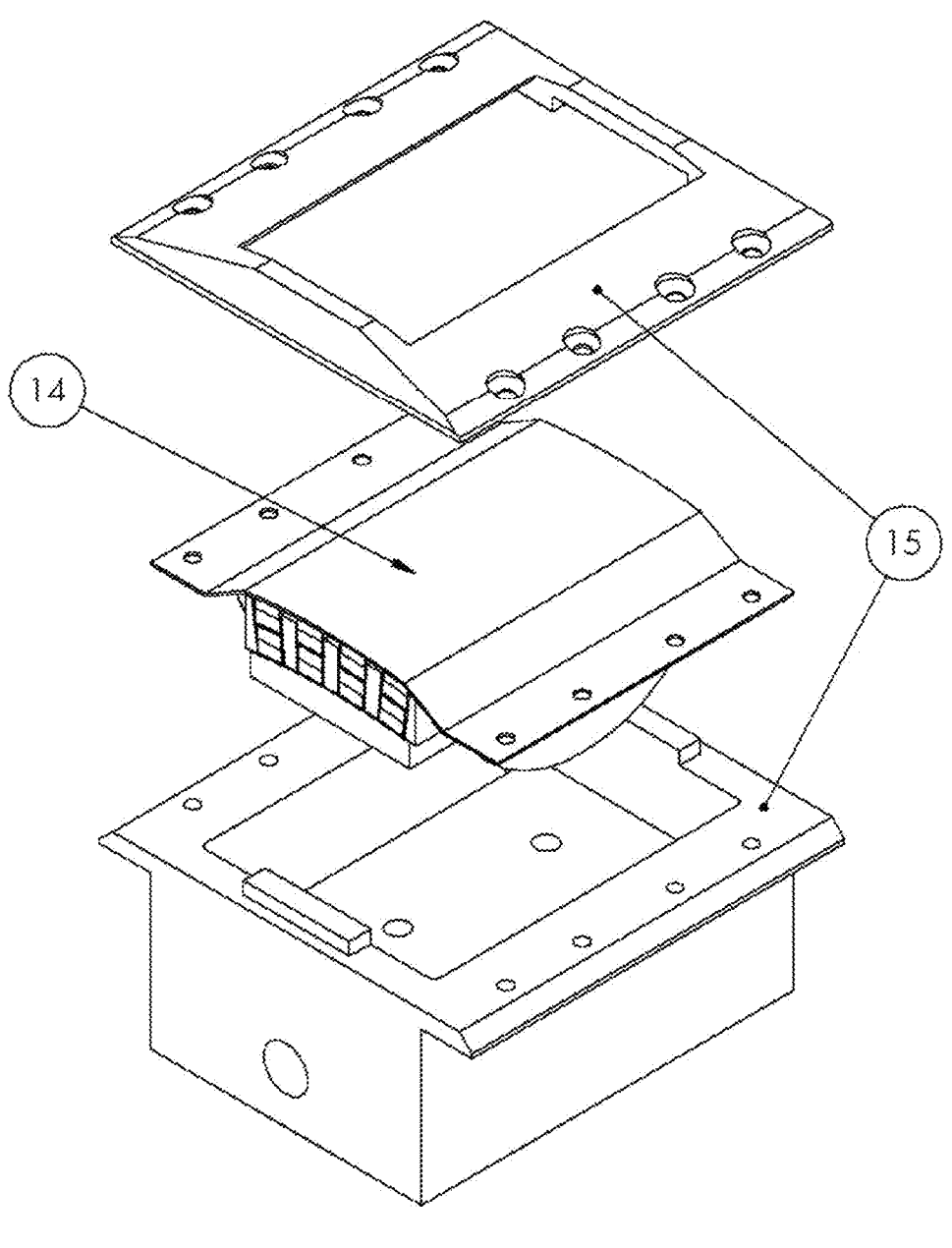
FIG. 4 presents an exploded view of the assembly of the functional elements of the EMAT sensor used in the pipe inspection tool, according to an exemplary configuration of the present invention.

According to a preferred and exemplary embodiment of the present invention, the final assembly of the internal components (14) of the sensors used in the inspection tool is shown in FIG. 4. In this configuration, the internal components (14) of the EMAT sensor are arranged inside of a housing (15), preferably made of metallic material, comprising a box and a lid. The function of the housing (15) is to support the internal components (14) and electrically shield the structure from external noise.

As mentioned earlier, the inspection tool of the present invention evaluates the structural integrity of a pipe as the tool body (1) moves along the same, bringing with it the array of sensors (7, 8), covering the entire the volume of material that makes up the line. Specifically, the sensor arrays (7, 8) identify and evaluate the remaining thickness of corrosion packages in the pipe (2) by means of shear waves of the family of the SH modes (SH0, SH1, SH2, etc.), as shown in an illustrative and exemplary manner by FIG. 5, which presents dispersion curves for plates, considering negligible the differences between this geometry and the circumferential geometry of the pipe, when the ratio of diameter to wall thickness is high, that is, when the diameter of the pipe (2) is large and the walls are thin.

As a preferred and exemplary embodiment of the present invention, the methods used for pipe inspection are presented for SH1 mode; however, alternatively, the methods can be applied to any higher order mode, given that the technique used is based on identifying the physical phenomenon of the cut-off frequency of the modes above SH0 that present a minimum existence condition in frequency. This minimum condition is directly related to the "thickness" dimension to be inspected.

Figure 6:
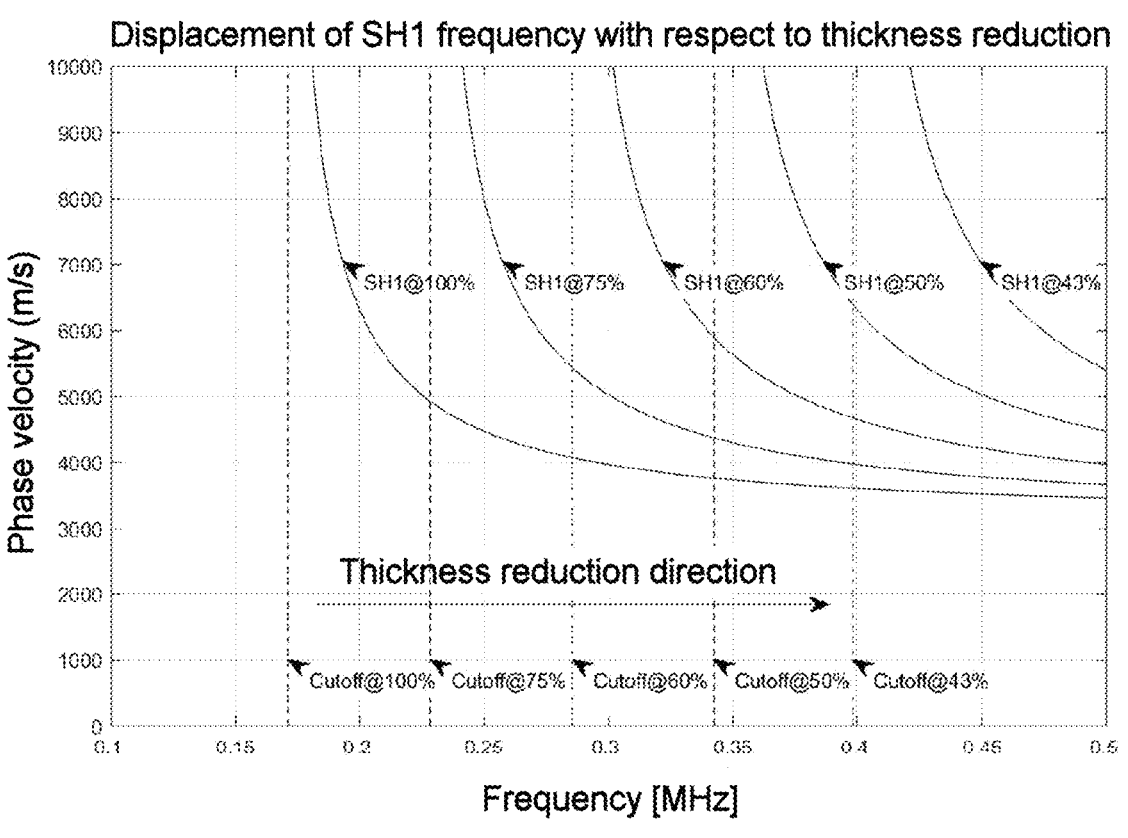
FIG. 6 presents an exemplary graph regarding the behavior of the cut-off frequency for different thicknesses from a reference thickness, according to an exemplary configuration of the present invention.

FIG. 6 presents, in an illustrative and exemplary manner, how the cut-off frequency behaves for the SH1 mode in relation to the thickness of the pipe (2). As seen in the graph, each line represents the SH1 mode for a given thickness, with the different thicknesses being represented in percentage terms of a reference thickness of the pipe (2).

Figure 5:
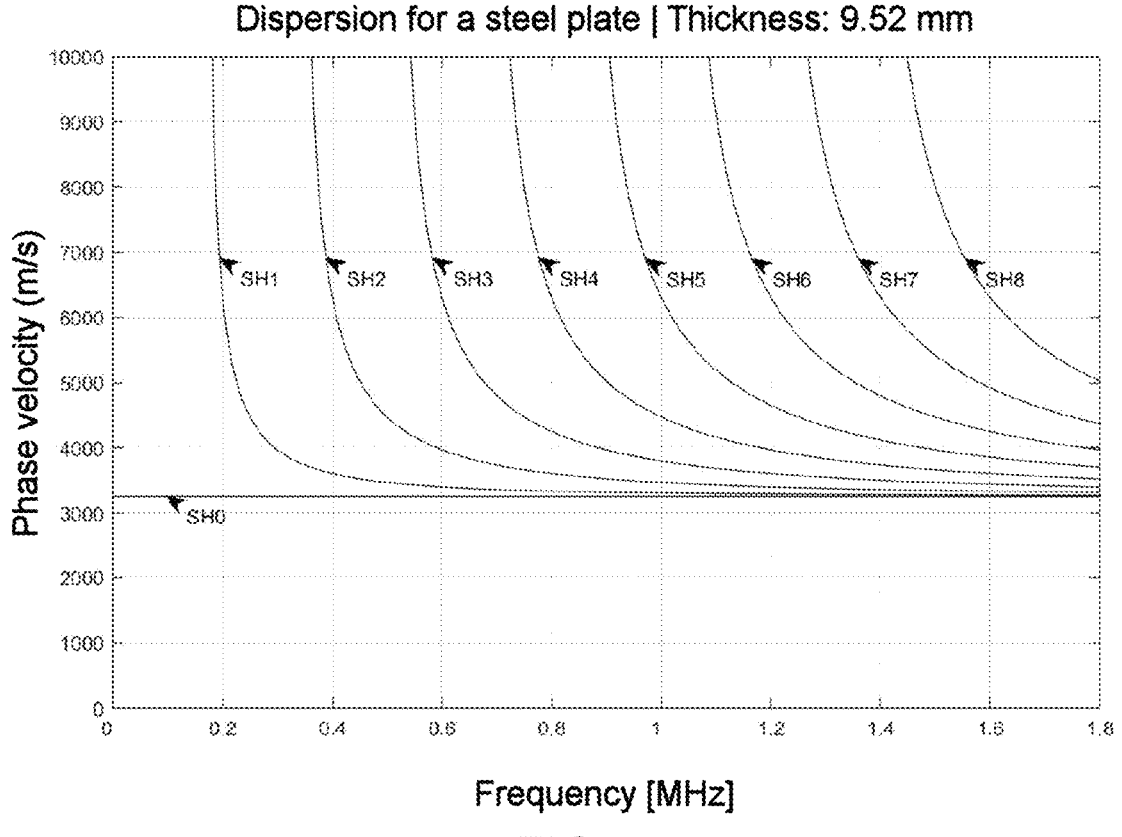
FIG. 5 presents an exemplary graph of a family of SH modes, according to an exemplary configuration of the present invention.

As seen in an exemplary manner in FIG. 5, the phase velocity variation in relation to the material thickness for a SH0 mode is considered constant. The SH0 mode is used to detect the presence of contact between the sensors (4, 5, 6) and the pipe (2) and the presence of a sonic path between the emitter sensor and the receiver sensor, in addition to being used for normalizing the detected signals through of the amplitude proportionality relationship with the SH1 mode.

The sensors (4, 5, 6) used in the inspection tool of the present invention act based on the selection of the wavelength and frequency range of interest used in the pipe (2) to explore the physical phenomenon of the cut-off frequency and to impose a condition of existence of the SH0 and SH1 modes that allows their separation.

To condition the frequency, a controlled waveform is applied to the sensor (4, 5, 6) at a certain frequency, wherein the sides of the wave can be smoothed by a "window". This control consequently allows controlling the frequency width of the applied waveform and the frequency of the modes to be emitted by the emitter sensor (4, 5) in the pipe (2).

Additionally, according to a preferred and exemplary embodiment of the present invention, the arrangement comprising the coil (9) and the set of magnets (10) of the sensors performs the wavelength conditioning. More particularly, the Lorentz's Force applied by this arrangement has a specific shape for controlling the wavelength determined based on the distance between the magnets of the set of magnets (10).

Figure 7:
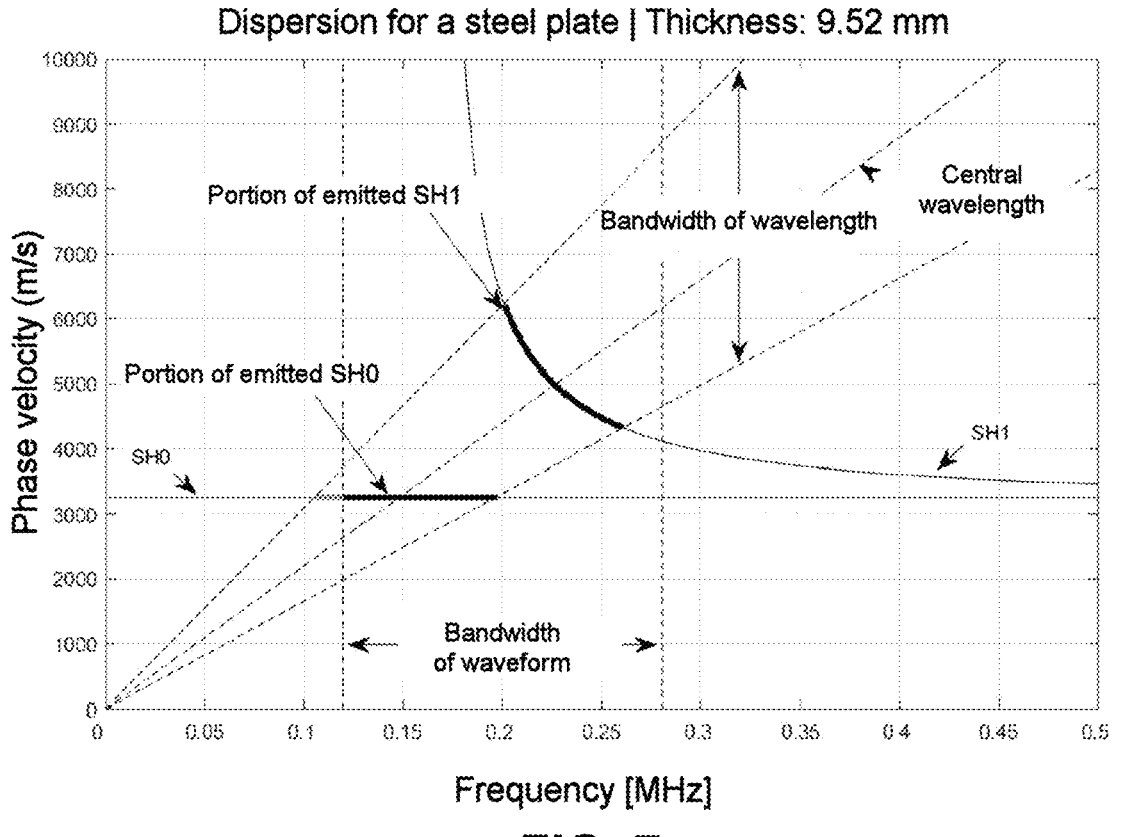
FIG. 7 presents an exemplary scheme of the control of modes emitted by the EMAT sensor of the tool, according to an exemplary configuration of the present invention.

The result of the frequency and wavelength control is represented, in an illustrative and exemplary manner, by FIG. 7, in which there are presented the phase velocity curves for SH0 and SH1 modes for the intact wall, that is, without defects. The dashed lines delimit the frequency bands and wavelengths applied by the sensor. The highlighted lines over the SH0 and SH1 modes demonstrate the regions of the modes that will be emitted with greater intensity by the respective emitter sensor (4, 5).

As mentioned earlier, the distance between the magnets of the set of magnets (10) allows the setting of a wavelength to be emitted and received from the inspected material of the pipe (2), to the detriment of other wavelengths that are out of the selected length range. Thus, setting the wavelength serves as a first step to select and filter the SH0 and SH1 modes of interest. To perform the separation of the SH0 and SH1 modes, most of the SH0 mode should be below the cut-off frequency of the SH1 mode. This ensures that the emitter sensor (4, 5), for the lowest frequencies, only emits the SH0 mode. For the frequency range above the cut-off frequency of the SH1 mode, the generation mechanism becomes the one of the wavelength.

In the upper frequency range, that is, frequencies above the cut-off frequency of SH1, the excitability of the SH1 mode prevails over the SH0 mode, due to the condition of symmetry with respect to the median plane of the guide, where the force is applied on only one of the surfaces. The median plane would be the plane parallel to the largest surface of the waveguide, and passing through the center of the waveguide thickness.

Figure 8A:
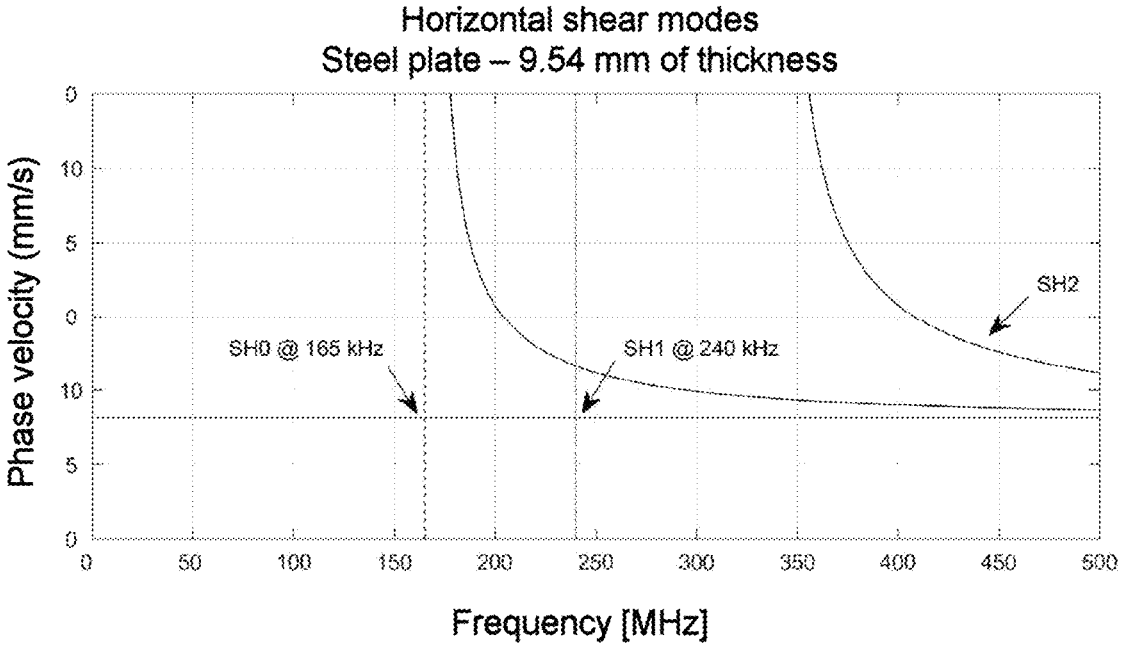
FIGS. 8A, 8B and 8C illustratively show the symmetry of the displacements of SH0 and SH1 modes, according to an exemplary configuration of the present invention.
Figure 8B:
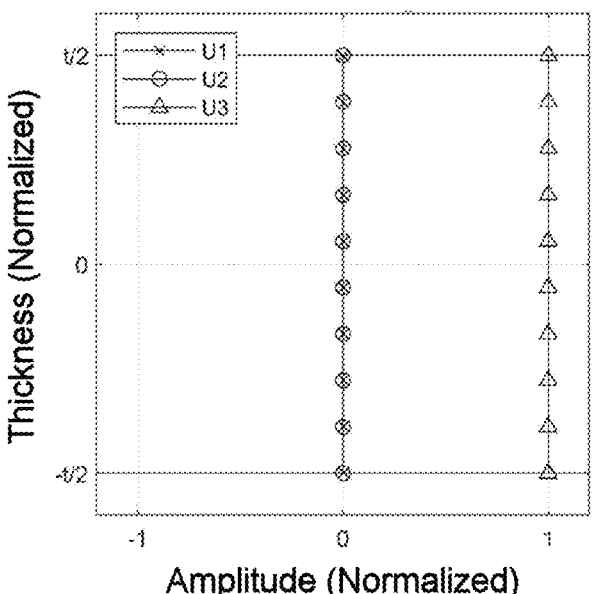
Figure 8C:
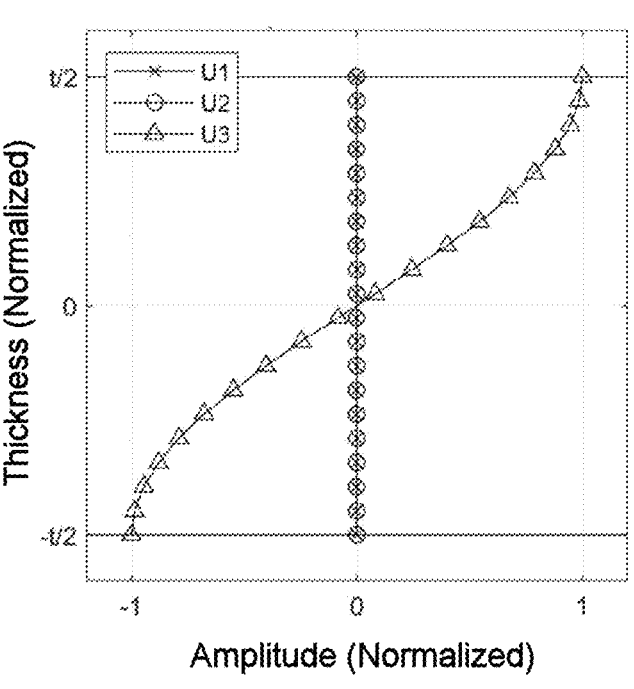

The symmetries of the mode displacements are represented in FIGS. 8A, 8B and 8C, in an illustrative and exemplary way.

Referring again to FIGS. 1A and 1B, the sensor arrangement (7) of the present invention uses at least two sensors (4), wherein one of the sensors acts as an emitter sensor (5) and the other acts as a receiver sensor (6). Such sensors are positioned distanced from each other in the circumferential direction. According to an alternative configuration of the present invention, the sensor arrangement (8) of the present invention uses at least three sensors, wherein one of the sensors acts as an emitter sensor (5) and the other two sensors act as receiver sensors (6).

Figure 9A:
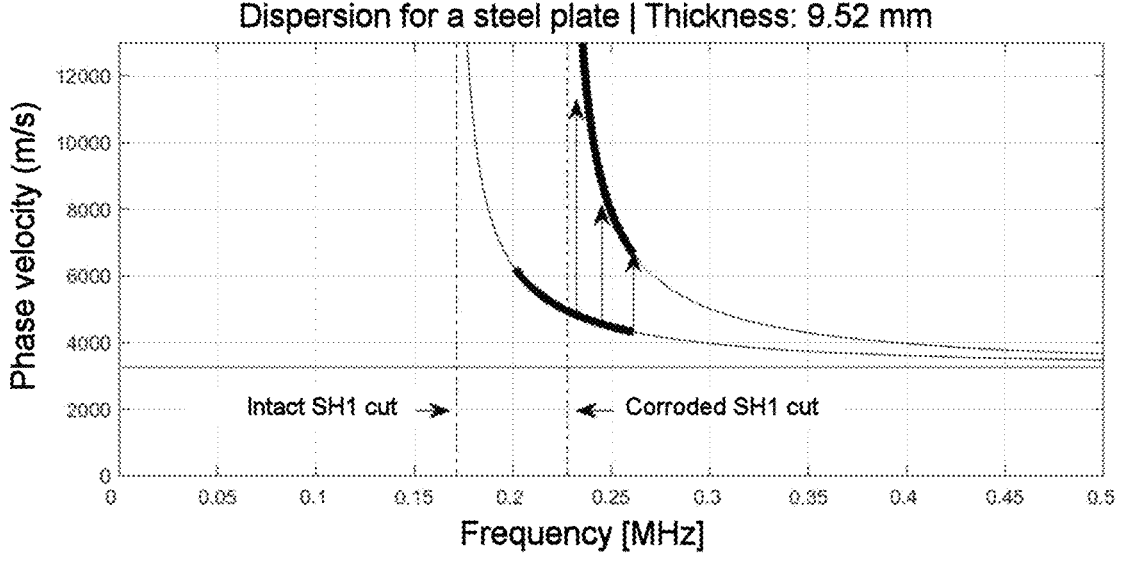
FIGS. 9A and 9B present an exemplary scheme of the effect of damage on the propagation of the SH1 mode for the condition before and after passing through the corrosion, respectively, according to an exemplary configuration of the present invention.
Figure 9B:
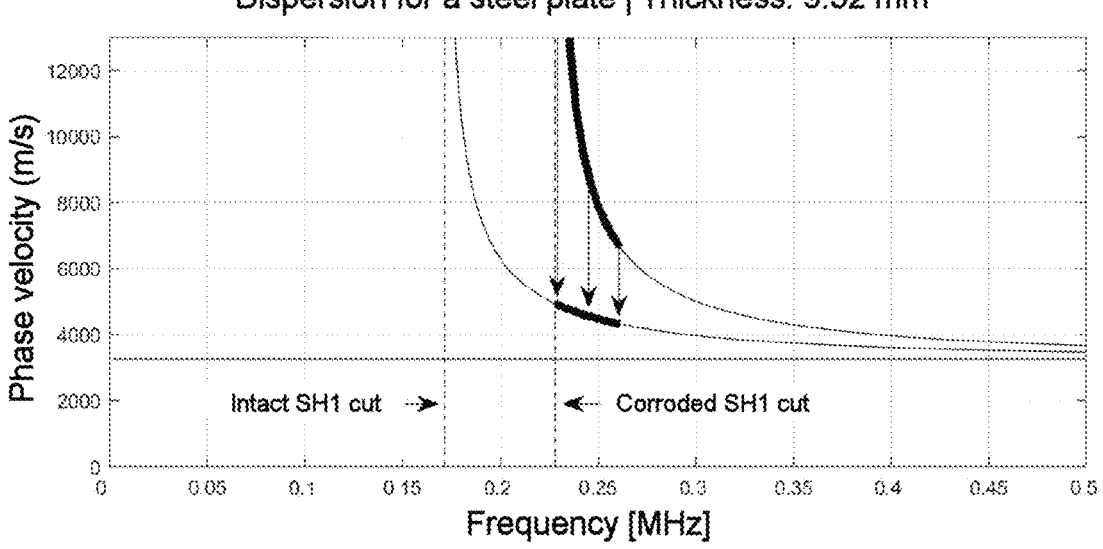
Figure 10:
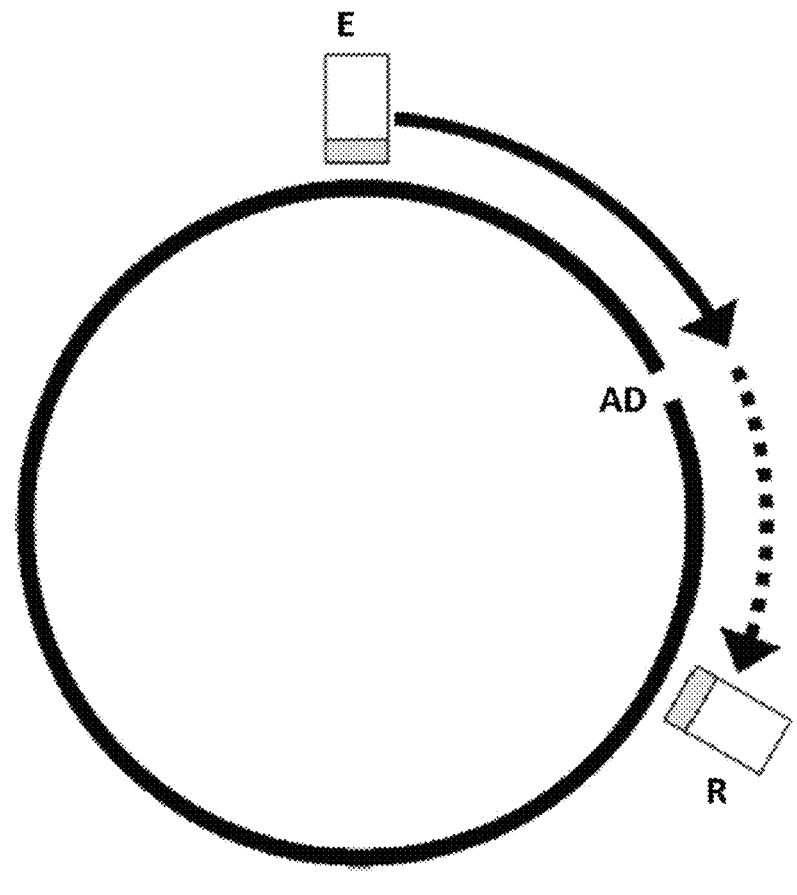
FIG. 10 shows, as an exemplary manner, a schematic arrangement of paired sensors, in which a wave passes through a region with the presence of damage, according to an exemplary configuration of the present invention.

The arrangement of the sensors (4, 5, 6) of the present invention causes a wave emitted by the emitter sensor (5) to cover a circumferential region of the pipe (2). When the wave passes through a region containing damage (a crack or fissure, for example), the wave is modified locally into an attenuation form in the wave in SH1 mode, which is then collected after the region inspected by the receiver sensor (6). FIGS. 9A and 9B, respectively, exemplarily illustrate the curve of the SH1 mode for the condition before and after the passage of the wave through the damage, that is, the scheme of the effect of the damage on the propagation of the SH1 mode. Additionally, FIG. 10 presents a demonstrative scheme of the wave passing through a region with damage for an array of paired sensors, according to a preferred and exemplary embodiment of the present invention.

According to the scheme shown in FIGS. 9A, 9B and 10, the emitted wave is divided into two components, wherein the wave component that finds a condition of existence in the region with the presence of damage returns to its place, while the component below of the cut-off frequency in the condition with the presence of damage is severely attenuated, because it finds no existence condition to follow.

Figure 11:
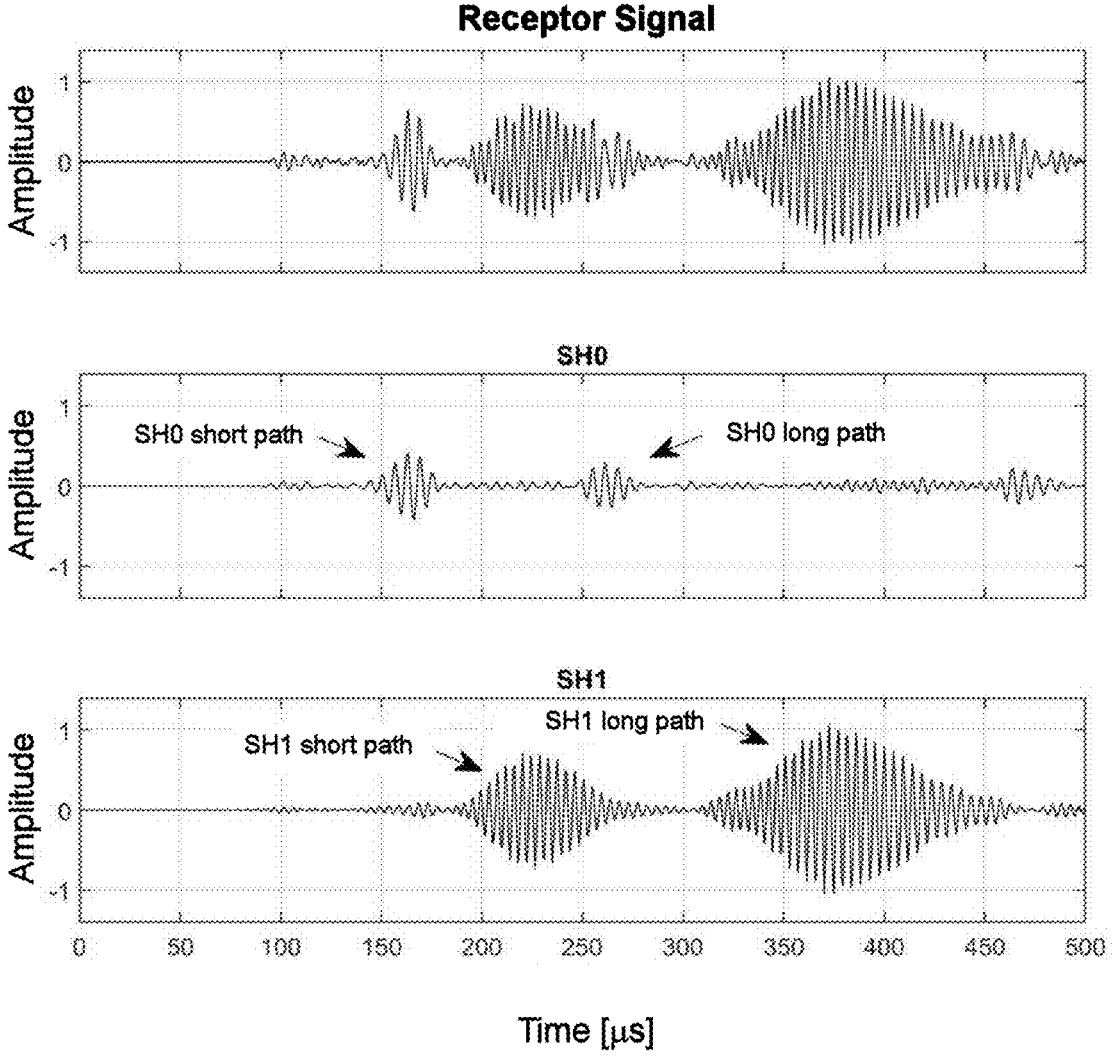
FIG. 11 presents, in an illustrative and exemplary manner, the separation of the respective overlays for the SH0 and SH1 modes, according to an exemplary configuration of the present invention.

Further, the signal measured by the receiver sensor contains a mixture of the two modes, SH0 and SH1, which may be superimposed. To separate the SH0 and SH1 modes, a pair of filters is applied to the signal for separation by its frequency band. According to a preferred and exemplary embodiment of the present invention, both filters can be of the bandpass type, wherein their cut-off frequencies are located in the region of the cut-off frequency of the SH1 mode. After the mode separation step, two signals are obtained, in which each of the signals represents a mode. FIG. 11 shows, in an illustrative and exemplary manner, the separation of the respective overlays for SH0 and SH1 modes.

Figure 12:
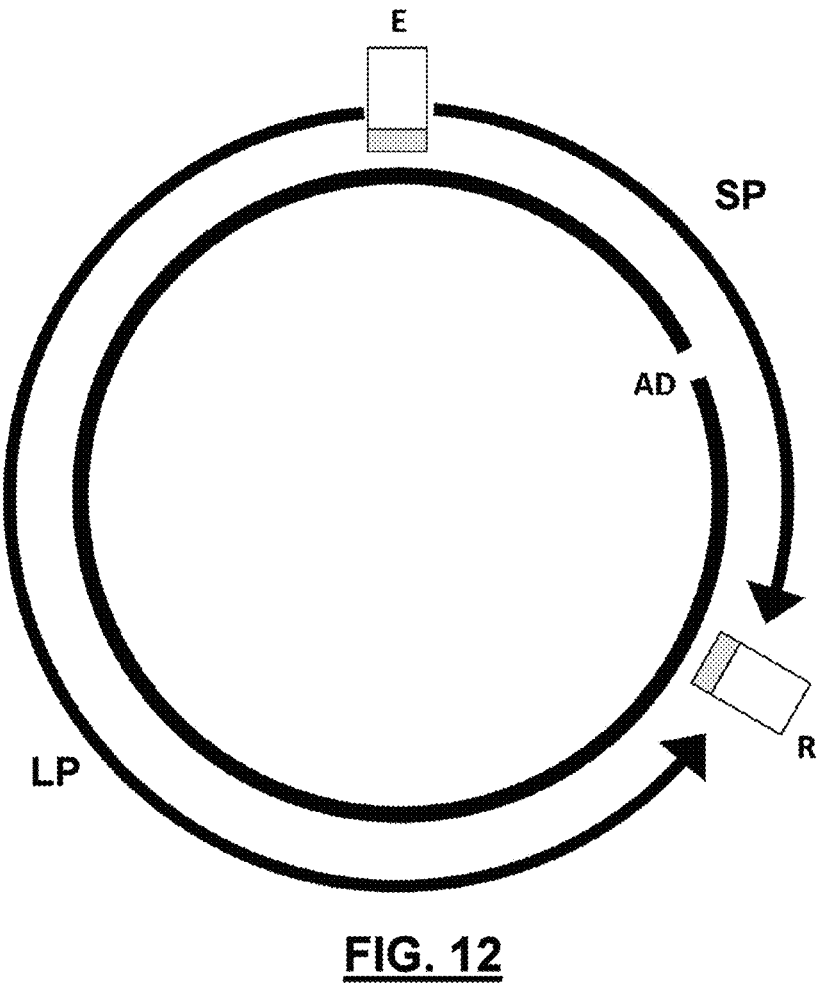
FIG. 12 presents, in an illustrative and exemplary manner, the paths taken by the waves that propagate from an emitter sensor to both circumferential directions, according to an exemplary configuration of the present invention.

Referring to FIGS. 1A and 1B, due to its construction symmetry, the emitter sensor (4, 5) of the tool can emit the same mechanical waves for both directions, clockwise and counterclockwise, in the circumferential direction. The distance traveled by the wave emitted by the emitter sensor (4, 5) can be classified as a short path, which is the shortest distance between the emitter sensor (4, 5) and the receiver sensor (4, 6), or a long path, which is the greatest distance between the emitter sensor (4, 5) and the receiver sensor (4, 6). Given the non-symmetry of the positioning of the sensors as a function of the long and short paths (LP, SP), the measured values for the referred paths do not overlay in time, as observed, by way of example, in FIGS. 11 and 12.

Figure 13:
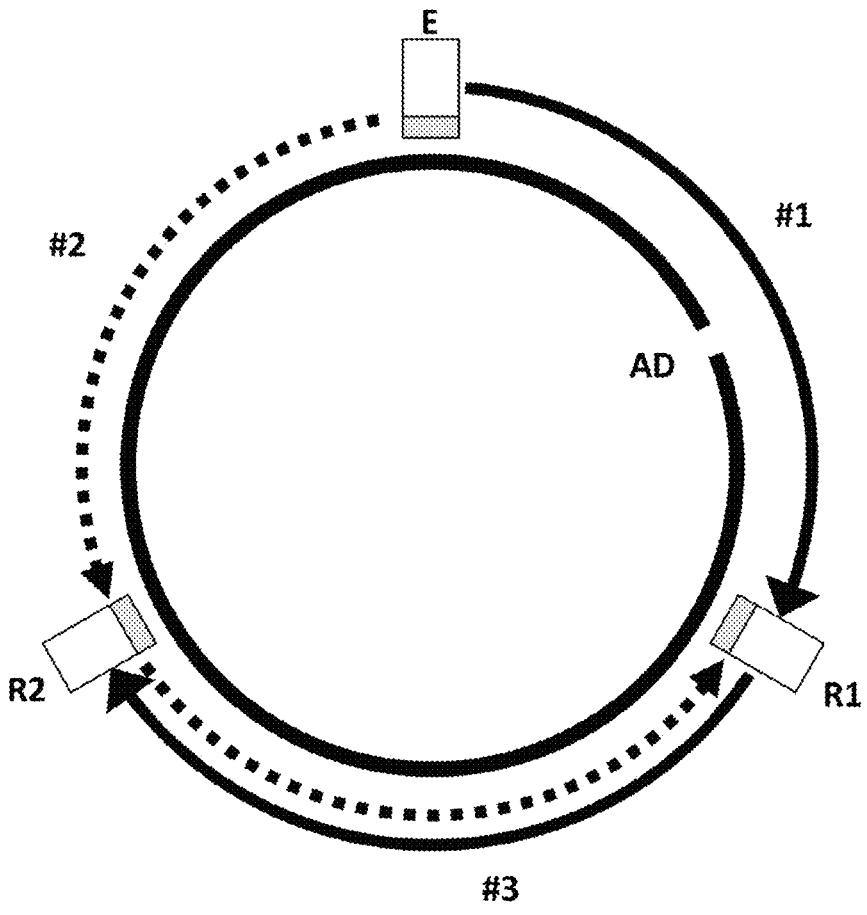
FIG. 13 shows, in an illustrative and exemplary manner, a schematic arrangement containing three sensors with three distinct detection regions, according to an exemplary configuration of the present invention.

In this way, the evaluation of damage in the inspected regions referring to the short and long paths becomes possible. According to a preferred and exemplary embodiment of the present invention, the paired arrangement (7) can be increased to the trio arrangement (8), as shown in FIGS. 1A and 1B, or any other arrangement containing more than two sensors, in order to create a plurality of overlays of evaluated regions in the structure of the pipe (2). Thus, the pipe (2) can be sectioned into a greater number of regions, improving the ability to circumferentially locate defects. FIG. 13 shows, according to a preferred and exemplary embodiment of the present invention, a scheme with a trio arrangement, containing three sensors (E, R1, R2), for example, EMAT sensors, wherein one of the sensors is an emitter sensor (E) and the other two sensors are emitters and receivers (R1, R2). Still according to FIG. 13, three different evaluation regions are visualized between the sensors, #1, #2, #3, and regions #1 and #2 come from the analysis of the short paths of each of the receivers (R1, R2), while for region #3 the evaluation comes from the analysis of the two long paths of the emitter sensor (E) in relation to the two receiver sensors (R1, R2).

According to a preferred and exemplary embodiment of the present invention, a pipe inspection method is provided based on the evaluation of the thickness of the pipe, responsible for characterizing the damage to the structure.

Thus, the method comprises a step to separate the vibration modes from a received signal, using two frequency filters, wherein the two frequency filters can be of the passband type. Particularly, in this step, the two frequency bands do not overlay and are divided by the cut-off frequency of the SH1 mode for the intact, undamaged thickness of the pipe (2).

Additionally, the pipe inspection method further comprises a signal normalization step. In this step, the values of the signal referring to SH1 are divided by the maximum value found from the signal referring to SH0. In this way, the data are represented on a scale of similar values regardless of other factors that affect the amplitude of the signals.

In addition, after the normalization step, the method further comprises a step of amplitude comparison. More specifically, a comparison of the normalized SH1 amplitude with a reference amplitude is performed, the reference amplitude being obtained from the pipe itself (2), in its intact condition, without damage. Thus, a percentage of the evaluated amplitude (normalized SH1) in relation to the reference amplitude (maximum) is obtained.

Additionally, the method further comprises a step of estimating the cut-off frequency. In particular, in this step, the normalized SH1 mode data are transformed to the frequency domain using a Fourier transform. Next, the lowest frequency in the signal that presents half of the maximum value of amplitude is obtained. Such a frequency will act as the cut-off frequency of the SH1 mode in the smallest thickness of the pipe (2) through which the signal has passed.

According to a preferred and exemplary embodiment of the present invention, the method further comprises a step to estimate the remaining thickness of the pipe (2). The estimate of the remaining thickness can be performed from the comparison of amplitudes, for values of wall thickness between approximately 100% and approximately 80%. Alternatively, the estimation of the remaining thickness can be performed from the estimation of the cut-off frequency for wall thickness values lower than approximately 85%, preferably between approximately 85% and 60%, wherein the lack of signal, attributed to walls with a thickness of less than 60%, represents severe damage to the pipe (2).

Those skilled in the art will value the knowledge presented herein and will be able to reproduce the invention in the presented embodiments and in other variants, encompassed by the scope of the attached claims.

The invention claimed is:

1. A pipe inspection tool comprising:
an elongate tool body;
a first articulated arm coupled to the tool body and extending away from the tool body;
a second articulated arm coupled to the tool body and extending away from the tool body; and
an emitter sensor coupled to the first articulated arm and a receiver sensor coupled to the second articulated arm, wherein each of the emitter sensor and the receiver sensor is positioned adjacent an inner surface of a pipe wall and positioned relative to each other such that there is a short path around the pipe wall between the emitter sensor and the receiver sensor in a clockwise direction and a long path around the pipe wall between the emitter sensor and the receiver sensor in a counterclockwise direction,
wherein the emitter sensor is configured to emit mechanical waves circumferentially in the clockwise direction and in the counterclockwise direction, and
wherein the receiver sensor is configured to receive the mechanical wave emitted from the emitter sensor along the short path and along the long path.

2. The pipe inspection tool of claim 1, wherein the first and second articulated arms are configured to independently position the emitter sensor and the receiver sensor at desired positions relative to the pipe wall.

3. The pipe inspection tool of claim 1, wherein the emitter sensor and the receiver sensor are separated by a distance of one-third of an inside perimeter of the pipe wall.

4. The inspection tool of claim 1, further comprising:
a third articulated arm coupled to the tool body and extending from the tool body; and
a second receiver coupled to the third articulated arm and positioned adjacent the inner surface of the pipe wall.

5. The inspection tool of claim 4, wherein the emitter sensor, receiver sensor, and second receiver sensor are positioned equidistant from each other.

6. The inspection tool of claim 1, wherein the emitter sensor and the receiver sensor each comprise:
a plurality of magnets;
a polymeric structure which holds the plurality of magnets into place and maintains separation between the plurality of magnets;
a block of ferromagnetic material coupled to a side of the plurality of magnets and configured to concentrate a magnetic field flux;
an electrical coil positioned on the other side of the plurality of magnets and positioned adjacent the pipe; and
a protective sheet of non-ferromagnetic metallic material positioned on the electrical coil.

7. The inspection tool of claim 6, wherein each of the sensors is configured to determine a direction and a magnitude of a Lorentz's force on the pipe wall which results in a specific mode of vibration in the pipe wall.

8. The inspection tool of claim 7, wherein the electrical coil is configured to control the direction of an induced current, and wherein the plurality of magnets are configured to control the direction of a generated magnetic field.

9. The inspection tool of claim 6, wherein the plurality of magnets are arranged in two rows positioned adjacent each other, wherein the magnets of each row are positioned such that the polarization of each magnet is opposite the polarization of the adjacent magnet in the other row.

10. The inspection tool of claim 6, wherein each sensor further comprises a housing which encompasses the plurality of magnets, polymeric structure, block of ferromagnetic material, electrical coil, and protective sheet.

11. The inspection tool of claim 10, wherein the housing provides electrical shielding from external noise.

* * * * *